United States Patent

[11] 3,627,874

| | | |
|---|---|---|
| [72] | Inventors | Philip P. Vella<br>Willingboro, N.J.;<br>Roy A. Machlowitz, Glenside, Pa. |
| [21] | Appl. No. | 842,362 |
| [22] | Filed | July 16, 1969 |
| [45] | Patented | Dec. 14, 1971 |
| [73] | Assignee | Merck & Co., Inc.<br>Rahway, N.J. |

[54] VACCINE PREPARATION
2 Claims, No Drawings

[52] U.S. Cl. .................................................. 424/88
[51] Int. Cl. .................................................. A61k 27/00
[50] Field of Search .................................... 424/88, 89, 92; 195/1.7

[56] References Cited
UNITED STATES PATENTS

| 3,429,867 | 2/1969 | Bozicevich .................... | 195/1.7 |
| 3,485,721 | 12/1969 | Woodhour et al. ............ | 424/88 |

Primary Examiner—Richard L. Huff
Attorneys—William H. Nicholson, Harry E. Westlake, Jr. and I. Louis Wolk ABSTRACT: A nonanaphylactic PPLO vaccine is prepared by propagation of the organism at controlled pH in a medium containing fractionated calf serum. The fractionated calf serum is prepared by precipitation of proteinaceous fractions from whole calf serum containing anaphylactic and growth inhibiting factors by addition of salts or by heating.

VACCINE PREPARATION

This invention relates to the production of vaccines in which the antigen is a pleuronemonialike organism (PPLO) which has been grown in a culture medium containing a fractionated serum component such as obtained from calf serum. The PPLO contemplated by the present invention are *Mycoplasma pharyngis, M. hominis, M. Salivarium M. fermentens, M. orale* (type 2), "T" strains, *M. arthritidis, M. bovigenitalium, M. gallisepticum, M. canis, M. mycoides, M. agalactiae, M. spumans, M. plumonis, M. neurolyticum,* and particularly *M. pneumoniae*. More particularly, the invention involves reduction or removal from the calf serum of the anaphylactic factor which is inherently present therein and which otherwise may be carried into the vaccine.

It has long been known that some persons suffering from pneumonialike symptoms are not infected with the classical pneumonococci bacteria but display a "primary atypical pneumonia" syndrome. Extensive studies over the past twenty years have shown that this disease is caused by a pleuropneumonialike organism (PPLO) which is designated as *Mycoplasma pneumoniae* or Eaton's agent. It is small enough in size that it is not removed by filtration, but it has cellular organization and is not classified as a virus. Although the mortality rate of the disease is extremely low it frequently has an incapacitating effect on infected persons. Consequently, attempts have been made to reproduce the *M. pneumoniae* in quantity for preparation of a vaccine for immunization against the causative organism.

Early studies of the growth of *M. pneumoniae* for vaccine preparation showed best growth results with media containing horse serum. However, as this nutrient material is not generally considered to be fully acceptable for parenteral injection in man, efforts have been made to supplant it with other nutrient media, but they have resulted in poor incubative growth of the *M. pneumoniae* or have introduced other problems which have caused them to be regarded as impractical.

One such effort is reported in an article entitled "*An Inactivated mycoplasma Pneumoniae Vaccine*" by K. E. Jensen et al., appearing in JAMA 194, 248–252, (1965). It used a culture medium containing the chloroform extract of the yolks of embryonated hens' eggs and produced a fairly good growth of the *M. pneumoniae* but a medically acceptable vaccine from this source is not publically available. Other experimental vaccines have been made by growing the *M. pneumoniae* in a culture medium containing calf serum as an essential ingredient but evidence has appeared that calf serum contains a sensitizing factor(s) which is frequently carried over into the vaccine. Tests on guinea pigs have shown that this latter type of vaccine can cause fatal anaphylactic shock reaction and would be unsuitable for routine injection into humans.

The present invention resides in the discovery that the fatal or paralytic anaphylactic shock factor(s) in calf serum is reduced to a nondetectable level, as measured by an extremely sensitive in vivo anaphylactic assay procedure, if a series of carefully controlled steps are carried out in a prescribed order. Each step alone appears to be insufficient to remove the anaphylactic factor(s) but their successive application has been found to produce a PPLO vaccine devoid of anaphylaxis attributable to the calf serum component used in the vaccine production medium or the horse serum component used in the medium employed at the time of the original isolation from a human clinical case. The essential steps of the process of this invention are: (1) pretreatment of the calf serum; (2) growth of PPLO of in a selected pH range; and (3) controlled washing of the PPLO growth.

The calf serum used in practicing this invention is the ordinary, commercially obtained material. It preferably is inactivated by heating it at about 56° C. for 20 to 60 (preferably 30) minutes in a conventional manner as taught by the prior art. Except for this heating period and during the procedure of this invention the serum should be maintained at 0° to −20° C. and preferably at about −20° C.

1. Pretreatment of Calf Serum

The pretreatment method of this invention has as its purpose the removal of as much as possible of factor(s) present in whole calf serum which causes anaphylactic response in the host. This is accomplished generally by a fractionation process which separates from the serum certain proteinaceous materials without impairing the ability of the fractionated serum to support the growth of PPLO. In fact it has been found as an added feature of this invention that the pretreatment substantially improves the ability of the serum to support growth of PPLO apparently by removal of growth inhibiting factors from the whole calf serum. While concentrations of greater than about 10 percent of the latter in the growth medium decreases the growth of PPLO, concentrations above 10 percent of the treated calf serum of this invention produce an increase in PPLO growth.

The pretreatments contemplated by the process of this invention are for example protein precipitation with (a) salts such as ammonium sulfate or (b) heat treatment.

(a) In practice, pretreatment with ammonium sulfate in accordance with this invention, comprises the addition of about 250–300 mg. of ammonium sulfate per milliliter of whole calf serum, preferably about 278 mg./ml. gradually with stirring over 1 to about 5 minutes. After continued stirring for 2–10 minutes, preferably about 5 minutes, the pH is adjusted to within the range of 6.0 to 8.0 and preferably to pH 6.8 using a concentrated mineral acid, such as 5–12N hydrochloric acid.

This suspension is then mixed or stirred at an intermediate speed for 1–24 hours, preferably about 4 hours to assure maximum precipitation by the ammonium sulfate. The precipitate is then separated by filtration and/or centrifugation. The centrifugation is at about 8,000 to 12,000 G for from 5 to 20 minutes in an apparatus such as the Spinco Model L2-65 centrifuge using a No. 19 rotor at about 10,000 r.p.m.

The supernate is then dialyzed for 12 to 48, preferably 24 hours, against running tap water using a conventional cellulose casing selected for the passage of the ammonium sulfate. After that, it is dialyzed against a phosphate buffered saline solution having a pH of 6.5–7.5, preferably about 6.8, and an ionic strength of about 0.15 until less than about 10 $\mu g$./ml. of $(NH_4)^+$ remains, which normally requires from about 16 to 48 hours.

After this dialysis the serum fraction is sterilized by filtration. A suitable filtration procedure is to first use a Millipore prefilter followed by a $0.45\mu$–$0.22\mu$ Millipore filter. This serum fraction is used in the culture medium as will be explained.

EXAMPLE 1a.

To 1075 ml. of calf serum at 5° C. (which had previously been heat treated) there was added gradually with stirring 299 g. (278 mg./ml.), of ammonium sulfate.

After 5 minutes stirring, the pH was adjusted with 10N HCl to 6.8. The suspension was stirred at 5° C. for 4 hours then centrifuged in a No. 19 rotor at 11,000 r.p.m. (10 minutes). The supernates were decanted and pooled. The pool was dialyzed in 4 bags (27×1 inches flat) for 24 hours against running tap water then for 16 hours at 5° C. against phosphate buffered saline, consisting of 7 g. NaCl 1.7 g. $Na_2HPO_4 \cdot 12H_2O$, 0.2 g. $NaH_2PO_4 \cdot H_2O$ per liter of water. The contents of the dialysis bags were pooled, the final volume being about 1600 ml. This pool was then filtered through a 142 mm. diameter prefilter-0.45 $\mu$ Millipore combination. The filtrate was dispensed into vials, approximately 75 ml./vial.

Table I illustrates the effect of the ammonium sulfate pretreatment on the ability of the calf serum to support growth of PPLO in a growth medium such as described in example 2, as determined by analysis for DNA.

TABLE I

Effect of Ammonium Sulfate Pretreatment on Growth Supporting Potential of Calf Serum DNA, mcg./100 ml.

| Medium | Serum concentration, % | |
|---|---|---|
| | 5.0 | 10.0 |
| Whole calf serum | 123 | 103 |
| Pretreated calf serum | 83 | 180 | b. An alternative pretreatment method of this invention for eliminating the anaphylactic factor from whole calf serum comprises heating it to an elevated temperature. As previously described, the serum is conventionally heated at about 56°–60° C. for 20–60 minutes. As a feature of this invention, it has been found that heating to 65°–70° C. for 30–60 minutes, preferably about 60 minutes serves to greatly reduce the anaphylactic factor(s) present. Although all of the toxic factor(s) is not eliminated by this heat treatment, the product, like that from the ammonium sulfate precipitation described above, is more susceptible to the further detoxification steps of this invention.

Table II clearly demonstrates the efficacy of the heat treatment of this invention for diminishing the anaphylactic factor(s) present in whole calf serum. The table shows a comparison of the sensitizing capacity of whole calf serum which had been subjected to either the conventional inactivating heat treatment or the heat treatment of this invention as measured by the reciprocal serum dilutions at which 50 percent of sensitized guinea pigs suffer fatal anaphylaxis.

TABLE II

| Sensitizing material whole calf serum | Challenge whole calf serum | |
|---|---|---|
| | $\Delta 56°$ C. for 30' | $\Delta 65°$ C. for 60' |
| heated 56° C. for 30 min. | 1:1000 | 1:325 |
| heated 65° C. for 60 min. | 1:199 | 1:159 |

As observed above the heat treatment greatly reduces anaphylactic factor(s) present. This pretreatment also serves to eliminate growth inhibitors from the whole serum, as was found with the ammonium sulfate pretreatment, thus permitting a higher yield of PPLO growth per unit volume of calf serum, and also permitting higher concentrations of serum per unit volume of growth medium.

Table III illustrates the effect of temperature and heating time on the ability of the treated calf serum to support PPLO growth in a medium such as is described in section (2) below, as determined by analysis for DNA.

TABLE III

Effect of Heat Pretreatment of Growth Supporting Potential of Calf Serum for *M. pneumoniae*

| Treatment | | DNA (mcg./100 ml.) Serum Concentration (%) | | |
|---|---|---|---|---|
| Temp. (°C.) | Time (Min.) | 5 | 10 | 20 |
| 56 | 30 | 81 | 71 | 48 |
| 60 | 30 | 116 | 46 | 16 |
| 65 | 30 | 106 | 186 | — |
| 65 | 60 | 100 | 223 | — |
| 70 | 30 | — | 187 | 272 |

EXAMPLE 1b.

A bottle of whole calf serum at −20° C. was immersed in a water bath held at 65° C. After 1 hour the mobile phase of the serum, representing about 75 percent of the total volume, was decanted from a gelatinous proteinaceous residue. The mobile phase is the pretreated serum used in the growth medium for propagation of the PPLO.

2. Growth of *M*.

The second step in the method of this invention is the growth of the PPLO in a medium containing a pretreated calf serum. These pretreated calf sera are used in a conventional manner in a known nutrient medium for growing the PPLO. One such nutrient medium is that referred to by R. M. Chanock, et al. in *Proc. Natl. Acad. Sci.* 48, 41–49, (1962). Instead of the horse serum used by Chanock, the pretreated calf serum of this invention is added in a 5–20 percent (v/v) concentration of the final volume of the basal medium.

Incubation is carried out in a conventional manner, for instance, following the procedure described in the Chanock et al. reference.

PPLO can be grown on glass or other surfaces as for example Blake or Brockway glass bottles or in such bottles containing glass beads of 4–5 mm. diameter, or mass culture can also be carried out in a stacked multi disc culture apparatus. It is also possible to grow the PPLO organism unattached in conventional submerged culture.

Regardless of the physical facilities, one of the embodiments of this invention is pH adjustment of the fermentation medium. As shown in table IV, the amount of growth is markedly affected by small pH changes. It has been found that maximum growth occurs with an initial pH between about 7.0 and 8.0, preferably at about 7.5–8.0.

The preferred agent for pH adjustment is an alkali metal bicarbonate, such as potassium bicarbonate or sodium bicarbonate but other methods of pH control may be used such as a compatible buffer system.

TABLE IV

The effect of pH on *M. pneumoniae* growth in 5.0 percent whole calf serum medium

| Sample Designation | DNA, mcg./100 ml. | pH of harvest overlay |
|---|---|---|
| W–1, no bicarbonate | 36.5 | 6.7, 6.75 |
| W–2, no bicarbonate | 58.5 | 6.8, 7.0 |
| W–3, no bicarbonate | 48.0 | 6.75, 6.8 |
| W–4, no bicarbonate | 54.5 | 6.9, 6.9 |
| W–5, no bicarbonate | 51.5 | 7.0, 7.1 |
| W–6, bicarbonate | 170.0 | 7.5, 7.5 |
| W–7, bicarbonate | 161.5 | 7.15, 7.25 |
| W–8, bicarbonate | 150.0 | 7.2, 7.4 |
| W–11, bicarbonate | 118.0 | 7.65, 7.7 |
| W–12, bicarbonate | 123.0 | 7.5, 7.55 |

As well as having an effect on the growth potential of the serum as demonstrated by table IV, pH has a definite demonstrable effect on the antigenic efficacy. It is essential that the pH of the growth medium be at 6.8 or above, preferably in the range of 7.0–7.2, at the time of harvest in order to assure maximum antigenic efficacy of the vaccine preparation.

TABLE V

[Effect of pH on antigenic efficacy of *M. pneumoniae*]

| Experiment number | Incubation time at 36° C., days | DNA (mcg./100 ml.) (glass attached) | Harvest pH | Antigenic extinction [1] |
|---|---|---|---|---|
| 1. Antigenic study DNA-IV. | 4 | 36.0 | 6.8 | 1:263 |
| | 6 | 44.5 | 5.8 | 1:83 |
| | 8 | 42.0 | 5.4 | 1:32 |
| | 1 (bicarb) | 0 | 7.5 | <1 |
| | (no bicarb) | 0 | 7.8 | <1 |
| | 2 (bicarb) | 8.0 | 7.1 | 1:2 |
| | (no bicarb) | 7.5 | 7.85 | <1 |
| | 3 (bicarb) | 60.0 | 6.7 | 1:3 |
| 2. PL-gc #17 bicarbonate (75% w./v.) added at 3.0 ml./100 ml. | (no bicarb) | 58.0 | 7.5 | 1:10 |
| | 4 (bicarb) | 54.0 | 5.9 | 1:5 |
| | (no bicarb) | 80.0 | 7.1 | 1:27 |
| | 5 (bicarb) | 30.0 | 5.5 | <1 |
| | (no bicarb) | 109.0 | 6.85 | 1:40 |
| | 6 (bicarb) | | | |
| | (no bicarb) | 130.0 | 6.1 | 1:25 |
| | 7 (bicarb) | | | |
| | (no bicarb) | 145.0 | 5.9 | 1:13 |

[1] Titre in guinea pigs ($CR_{50}$).

A representative fermentation procedure is the following using the product of example 1(*a*) or 1(*b*).

EXAMPLE 2

The culture medium was prepared to have the following composition:

|  | ml. |
|---|---|
| Difco PPLO broth | 70.0 |
| Yeast extract, 25% w/v aqueous | 10.0 |
| Calf serum of example 1 | 20.0 |
| NaHCO$_3$ 7.5% w/v aqueous | 4.0 |
| Glucose, 50.0% w/v aqueous | 2.0 |

This medium was dispensed aseptically into 32 oz. flat sided (such as Brockway or Blake) bottles so that each contained 100 ml. The PPLO used was initially obtained from a human clinical case of atypical pneumonia (strain 1482, Fr. 4) and a subsequent passage was identified as MAS–27; it was passaged 5 times before growth in the above medium. Each bottle was seeded with 10 ml. of the organism (P5) and incubation was carried out at 36°–37° C. with the bottles in a horizontal, stationary position.

After 2 days incubation this sixth passage (P6) culture was observed microscopically to have a moderate number of PPLO colonies attached to the glass surface of the growth vessel (the PPLO colonies were of small and medium size). The infected fluids from passage 6 were passed into fresh medium (Pb 7) of the composition described above. Passage 8 was made from passage 7 fluids after three days incubation. Microscopic observation of passage 7 revealed a confluent layer of PPLO colonies (which were small to large in size) attached to the glass surface. After 4 days of incubation at 36°–37° C. in a horizontal, stationary position, the bottles representing the eighth passage were harvested.

TABLE VI

[Growth of *M. pneumoniae* in the indicated media after incubation at 36° C.]

| Experiment Number | Medium | Incubation time at 36° C., days | DNA, mcg./100 ml. Broth plus glass | Broth | Glass | Harvest wash |
|---|---|---|---|---|---|---|
| GB–1A | 5% whole calf serum | 7 | 308 | 92 | 162 | 18 |
| GB–1B | do | 7 | 305 | 100 | 205 | 22 |
| GB–2 | 20% calf ammonium sulfate fraction. | 4 | 438 | 200 | 143 | 3 |

3. Washing of PPLO Growth

The PPLO are harvested by decanting the overlay medium and washing the glass-adhered growth with a phosphate buffered saline solution containing thimerosal and formaldehyde. The overlay medium and the washings are discarded except for a small amount of residual fluid from the second wash in which the culture is suspended. Generally two additional washes of the PPLO suspension are conducted in the ultracentrifuge at 15,000–30,000 G. at 0°–10° C.

EXAMPLE 3

The overlay medium in each of 27 bottles (32 once Brockways) was poured off and discarded. The organisms attached to the glass surface were washed twice (100.0 ml./bottle/wash) with the phosphate buffered saline solution described in example 1(a) containing in addition final concentrations of formaldehyde and thimerosal at approximately 90 to 100 mcg./ml. and 50–60 mcg./ml., respectively. 3 to 4 mil. of the second wash fluid was allowed to remain in each of the 27 bottles and the glass attached organisms were scraped from the surface with sterile rubber "policemen" attached to glass rods using aseptic techniques. The remaining fluid from each bottled was removed with a sterile serological pipette and combined into a common pool.

The combined harvest was washed in a Spinco ultracentrifuge (model L, No. 21 rotor) twice at 15,000 r.p.m. for 1 hour at 4° C. After the last wash the fluid volume was adjusted to 45 ml. (one-sixtieth of the original harvest volume) using the phosphate buffered saline solution containing formaldehyde and thimerosal.

The pre- and post-Spinco concentrates were assayed for sedimentable DNA and total non-dialyzable protein:

|  | mcg. DNA/ml. | mcg. protein/ml. |
|---|---|---|
| Pre-Spinco (20X) | 51.8 | not available |
| Post-Spinco (60X) | 148.0 | 2304.0 |

The results of DNA and protein assays are indicative of the total PPLO organism content attached to the surface.

The above post-Spinco concentrate is directly usable as a vaccine. To this purpose, 0.5 or 1.0 ml. of it would be injected intramuscularly, or, this concentrate would be dispensed and sealed in single dose or multidose containers.

To prove that a vaccine made from PPLO grown in a medium containing the calf serum fractions of this invention is entirely or substantially free of calf serum sensitizing factor(s), tests for anaphylaxis were performed in guinea pigs of either sex weighing between 375–450 grams. These animals were sensitized by injecting the vaccine subcutaneously. There was a 4–6 day interval between each sensitizing injection (3 injections were administered). Thirty to 35 days after the last sensitizing injection the animals received a predetermined challenge injection of whole calf serum or horse serum that was administered intracardially. Then the animals were observed for the usual anaphylactic shock symptoms; rubbing nose, sneezing (1+); coughing-gasping and inability to walk straight (2+); paralysis of any or all limbs (3+); death (4+). Guinea pigs injected with known sensitizing agents as well as uninjected animals were included in the test for control purposes. The results of these tests are shown in table VII.

TABLE VII

[Anaphylactic shock reaction of guinea pigs sensitized with the indicated Eaton PPLO vaccine]

| Sensitizing material | Challenge material | Anaphylactic shock Fatal Number[1] | Per-cent | Non-fatal Number[1] | Per-cent | Reactions Number[1] | Per-cent | DNA γ/ml. | pH harvest |
|---|---|---|---|---|---|---|---|---|---|
| A. PPLO grown in medium:[2] | | | | | | | | | |
| 1. Sample SV–16 | | 0/11 | 0 | 0/11 | 0 | 11/11 | 100 | 37.5 | 6.8 |
| 2. Sample SV–17 | | 0/11 | 0 | 2/10 | 20 | 8/10 | 80 | 35.8 | 7.35 |
| 3. Sample 171–1 | Whole calf serum | 0/12 | 0 | 1/12 | 8 | 11/12 | 92 | 34.0 | 7.0 |
| 4. Sample 171–2 | | 0/12 | 0 | 0/12 | 0 | 12/12 | 100 | 35.7 | 5.6 |
| 5. Sample 171–3 | | 0/12 | 0 | 0/12 | 0 | 12/12 | 100 | 35.6 | 6.1 |
| B. PPLO grown in medium containing whole horse serum. | Whole horse serum | 6/6 | 100 | 0 | 0 | 0 | 0 | 5.0 | ? |
| C. Controls: | | | | | | | | | |
| 1. Whole calf serum | Whole calf serum | 5/6 | 83 | 1/6 | 17 | 0/6 | 0 | | |
| 2. Whole horse serum | Whole horse serum | 6/6 | 100 | 0/6 | 0 | 0/6 | 0 | | |
| 3. Uninjected | Whole calf serum | 0/12 | 0 | 0/12 | 0 | 12/12 | 100 | | |

[1] Number of responding animals/number of animals challenged.
[2] Containing fractionated calf serum. (NH$_4$)$_2$SO$_4$ pptd.

Table IV shows that no deaths resulted from the use of a vaccine made by growing the PPLO in the calf serum fraction of this invention. There was an occasional incidence of a non-fatal reaction but only of the minor "1+" or "2+" type.

What is claimed is:

1. In a process for the preparation of a PPLO vaccine comprising the steps of propagating PPLO in a serum-containing growth medium, washing, collecting, inactivating and concentrating the PPLO, the improvements which comprise:
a. using as the serum portion of the growth medium, 5–20 percent by volume of a fraction of whole calf serum prepared by (1) addition of 250–300 mg. of ammonium sulfate per ml. of whole calf serum, (2) adjustment of the pH to 6.0–8.0, (3) separation of the precipitate, (4) dialysis of the supernatant against water and against phosphate buffered saline at pH 6.5–7.5, and (5) sterile filtration;
b. controlling the growth medium at pH 7–8; whereby the PPLO vaccine produced is essentially nonanaphylactic.

2. The process of claim 1 wherein the PPLO is *Mycoplasma pneumoniae*.

* * * * *

UNITED STATES PATENT OFFICE
CERTIFICATE OF CORRECTION

Patent No. 3,627,874           Dated December 14, 1971

Inventor(s) Philip P. Vella and Roy A. Machlowitz

It is certified that error appears in the above-identified patent and that said Letters Patent are hereby corrected as shown below:

Column 2, lines 44, 45 and 63, Millipore is a registered trademark and should read Millipore $^R$.

Column 3, line 54, ...Effect of Heat Pretreatment of Growth... should read "Effect of Heat Pretreatment on Growth..."

Column 3, line 75, insert "pneumoniae" after M. The line now reads -   2. Growth of M. pneumoniae.

Column 4, line 67, in Table V, Experiment number 2 change ....bonate (75% w./v.)... to read "bonate (7.5% w./v.)".

Column 5, line 51, ...(32 once... should read "(32 ounce".

Table VII, number 2 under Section A which reads ...2. Sample SV-17, ... change 0/11 to read 0/10 under the column titled Fatal, Number[1].

Signed and sealed this 5th day of December 1972.

(SEAL)
Attest:

EDWARD M. FLETCHER, JR.
Attesting Officer

ROBERT GOTTSCHALK
Commissioner of Patents